(12) United States Patent
Koyo et al.

(10) Patent No.: US 7,217,448 B2
(45) Date of Patent: May 15, 2007

(54) GLASS STRUCTURE AND METHOD FOR PRODUCING THE SAME

(75) Inventors: Hirotaka Koyo, Osaka (JP); Keiji Tsunetomo, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 115 days.

(21) Appl. No.: 10/369,604

(22) Filed: Feb. 21, 2003

(65) Prior Publication Data

US 2003/0217568 A1    Nov. 27, 2003

(30) Foreign Application Priority Data

Feb. 22, 2002    (JP)    ............................ P2002-045667

(51) Int. Cl.
*C03C 21/00*    (2006.01)
(52) U.S. Cl. ........................................ 428/131; 501/11
(58) Field of Classification Search ................ 428/131, 428/132, 134; 501/11
See application file for complete search history.

(56) References Cited

U.S. PATENT DOCUMENTS 4,495,299 A * 1/1985 Noguchi et al. .............. 501/72
5,910,256 A * 6/1999 Tsunetomo et al. ........... 216/24
6,143,382 A * 11/2000 Koyama et al. ............ 428/34.4
6,208,791 B1 * 3/2001 Bischel et al. .............. 385/129
6,262,389 B1 * 7/2001 Koyama et al. ........ 219/121.71

FOREIGN PATENT DOCUMENTS

JP    11-217237    8/1999

* cited by examiner

*Primary Examiner*—Alicia Chevalier
(74) *Attorney, Agent, or Firm*—Whitham, Curtis, Christofferson & Cook, P.C.

(57) ABSTRACT

A limited portion of a surface of a glass substrate is removed by application of a laser beam on the limited portion of the glass substrate to thereby produce a glass structure according to the invention. The glass substrate contains at least one element such as titanium, iron, vanadium, bismuth, lead, thallium, tin, cerium, rhodium or cobalt capable of absorbing energy of the laser beam and has a threshold of not larger than 1.0 J/cm$^2$ per laser beam pulse in terms of machining energy of the laser beam. When such a glass substrate 21 is used, a glass structure having a through-hole 61 or cavity optional in sectional shape can be formed by irradiation with the laser beam 10.

16 Claims, 5 Drawing Sheets

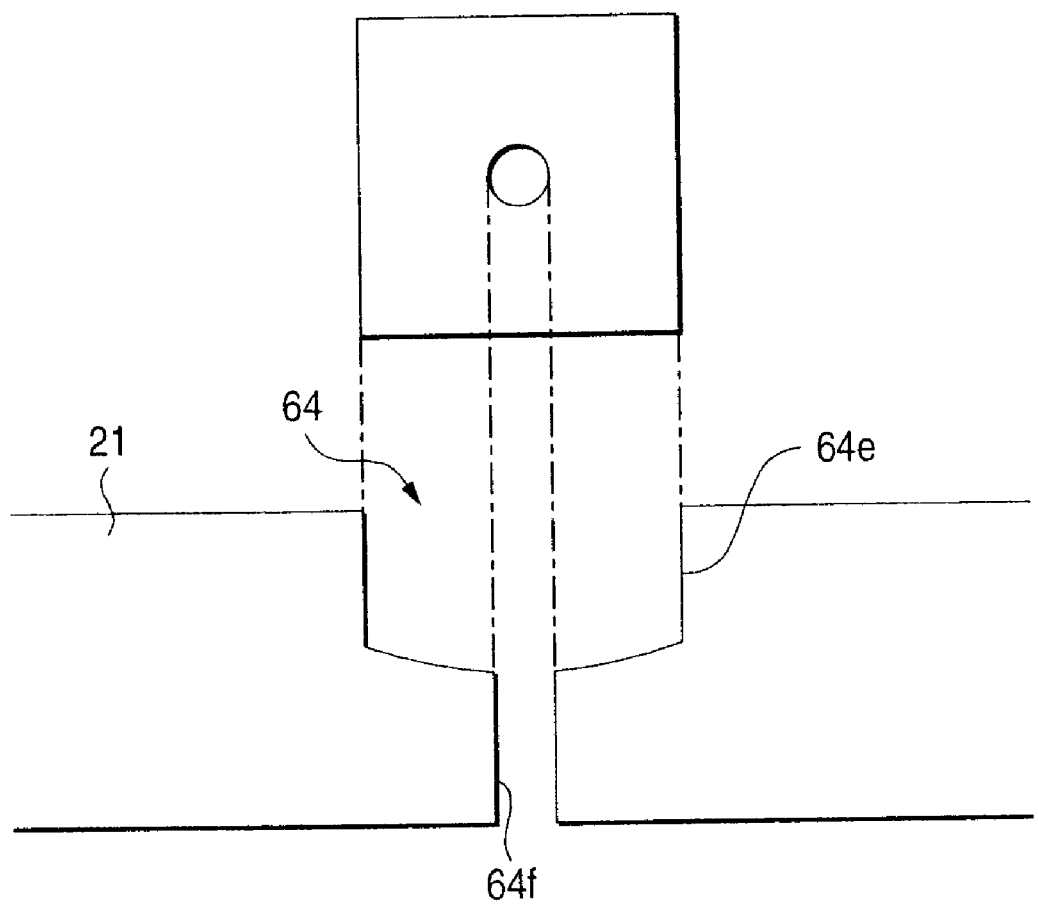

GLASS STRUCTURE AND METHOD FOR PRODUCING THE SAME

The present application is based on Japanese Patent Application No. P2002-45667, the entire contents of which are incorporated herein by reference.

BACKGROUND OF THE INVENTION

1. Field of the Invention

The present invention relates to a glass structure having a through-hole or a cavity and particularly to a glass structure produced by laser beam irradiation and a method for producing the glass structure.

2. Related Art

A glass structure constituted by a finely treated glass substrate is used as an optical component used in optical communication or as a micro lens incorporated in a display device. As a method for finely treating such a glass substrate, wet etching using an etching liquid such as hydrofluoric acid or dry etching such as reactive ion etching is heretofore used generally.

Wet etching, however, has a problem in management and disposal of the etching liquid. Dry etching has a problem that an etching apparatus, itself large in scale, is required because equipment such as a vacuum vessel, etc. is required. Moreover, there is also a problem that these etching methods are not efficient because a pattern mask or the like must be formed by a complex photolithographic technique.

On the other hand, direct treatment using a physical change such as heating, melting, vaporization or ablation generated in a material irradiated with a laser beam has been developed. Reduction in laser beam width and wavelength has been achieved with the advance of laser technology. An organic substance such as polyimide or a metal has been machined in the order of microns. A laser beam is suitable for fine treatment because it can be converged to a very small light spot.

Glass is however apt to crack when machined because it is a brittle material. For this reason, it was not easy to use laser machining for the purpose of fine treatment. To solve this problem, a glass fine-treatment technique in which silver is imported into glass by ion exchange to reduce a threshold for laser machining to thereby restrain the glass from cracking etc. has been developed as disclosed in JP-A-11-217237.

In glass containing a large amount of alkaline metal, however, a phenomenon that diffusion of silver ions into the glass is disturbed because of reduction of silver ions in a limited region near surface of the glass occurs though silver ions can be imported into the glass by ion exchange. For this reason, an effective laser machining region is limited to a neighborhood of the glass surface. Accordingly, it is still difficult to process a glass substrate up to the inside of glass three-dimensionally with a high degree of freedom in such a manner that a through-hole is formed in the glass substrate and then the taper angle of a wall surface of the through-hole is further adjusted.

Even in the case where silver ions are not reduced in a neighborhood of the glass surface so that the silver ions can be diffused into the glass, the concentration of silver ions in the glass surface becomes always high because the silver ions must be imported into the glass through the glass surface by a diffusing process. Accordingly, treatment for a very long time is required for increasing the silver ion concentration in the inside of the glass to be approximately equal to that in the glass surface. Hence, there is a problem in production efficiency.

SUMMARY OF THE INVENTION

The invention is developed to solve the problems and an object of the invention is to provide a glass structure constituted by a glass substrate in which a through-hole or cavity having a shape high in the degree of freedom is formed, and a method for producing the glass structure.

A glass structure provided according to the invention is constituted by a parallel-plate glass substrate in which a through-hole or cavity is formed in a thickness direction of the glass substrate. The term "cavity" hereinafter used means a hole which is formed so as not to pass through the glass substrate.

In the case of a through-hole, a sectional shape of the hole taken in parallel to surfaces of the glass substrate varies in accordance with a positional change in a range of from one of the surfaces of the glass substrate to the other of the surfaces of the glass substrate. In a mode of the variation in sectional shape, the area of the sectional shape of the hole may decrease monotonically in the range of from one of the surfaces of the glass substrate to the other of the surfaces of the glass substrate. In another mode of the variation in sectional shape, the sectional area of the hole may take a minimum value in between the opposite surfaces of the glass substrate.

In each of the modes, a line connecting centers of gravity of respective sectional shapes of the hole may be formed as a straight line which is drawn in the range of from one of the surfaces of the glass substrate to the other of the surfaces of the glass substrate and which is inclined to a line normal to each surface of the glass substrate. Or, a line connecting centers of gravity of respective sectional shapes of the hole may be formed as a bent or curved line. In a specific mode of the variation in sectional shape, respective sectional shapes of the hole may have similar figures in the range of from one of the surfaces of the glass substrate to the other of the surfaces of the glass substrate.

In the case of a cavity, a sectional shape of the cavity taken in parallel to surfaces of the glass substrate varies in accordance with a positional change in a range of from one of the surfaces of the glass substrate to a neighborhood of a bottom of the cavity. The modes of the variation in sectional shape of the through-hole can be also applied to the variation in sectional shape of the cavity. The bottom of the cavity is however a portion unique in shape. Accordingly, the characteristic of the cavity is defined by the shape ranging from one of the surfaces of the glass substrate to a neighborhood of the bottom of the cavity excluding the bottom.

Here, the neighborhood of the bottom of the cavity means a position where a side face of the cavity reaches the bottom thereof, which is formed generally in a curved surface.

In a mode of the variation in shape, the area of the sectional shape of the cavity may decrease monotonically in the range of from the surface of the glass substrate to the neighborhood of the bottom of the cavity. In another mode of the variation in shape, the sectional area of the cavity may take a minimum value in between the surface of the glass substrate and the neighborhood of the bottom of the cavity.

In each of the modes, a line connecting centers of gravity of respective sectional shapes of the cavity may be formed as a straight line which is drawn in the range of from the surface of the glass substrate to the neighborhood of the bottom of the cavity and which is inclined to a line normal to the surface of the glass substrate. Or, a line connecting centers of gravity of respective sectional shapes of the cavity may be formed as a bent or curved line. In a specific mode of the variation in sectional shape, respective sectional shapes of the cavity may have similar figures in the range of from the surface of the glass substrate to the neighborhood of the bottom of the cavity.

Preferably, the glass structure is produced in such a manner that a limited portion of a surface of the glass substrate is irradiated with a laser beam so as to be removed by ablation or vaporization. In this case, preferably, the glass substrate contains uniformly at least one kind of element capable of absorbing energy of the laser beam.

Preferably, the element is at least one member selected from the group consisting of titanium, iron, vanadium, bismuth, lead, thallium, tin, cerium, rhodium, and cobalt. Particularly preferably, the glass substrate has a threshold of not larger than 1.0 J/cm$^2$ per laser beam pulse in terms of machining energy of the laser beam.

Preferably, the glass structure is produced by one of the following methods. In the first method, energy of a laser beam is changed continuously or intermittently in a process of production when the laser beam is applied on a limited portion of a surface of a parallel-plate glass substrate to remove the limited portion by ablation or vaporization.

In the second method, the beam spot diameter of a laser beam on an irradiated position of the glass substrate is changed continuously or intermittently in a process of production.

In each of the first and second methods, preferably, the distance between a light source of the laser beam and the glass substrate is changed. Or, a mask or stop may be preferably disposed in a neighborhood of the surface of the glass substrate at the time of irradiation with the laser beam so that the area of an aperture of the mask or stop is changed.

In the third method, a laser beam is applied in a direction inclined to a line normal to the glass substrate while the glass substrate is rotated relatively to an optical axis of the laser beam.

According to the invention, laser machining-purpose glass containing uniformly an element which can be imported into glass without ion exchange when the glass is melted and which absorbs laser beam energy to reduce a machining threshold is used as a workpiece, so that good processability can be obtained even in the inside of the glass. As a result, shape controllability can be improved even in the inside of the glass, so that a machined glass article high in the degree of freedom three-dimensionally can be obtained.

In the producing method according to the invention, a glass structure having a predetermined three-dimensional shape can be produced easily with good controllability if energy of the applied laser beam is controlled three-dimensionally.

To obtain a complex machined glass article high in the degree of freedom three-dimensionally, an optical system through which the laser beam passes till the laser beam is applied on a specimen after emission of the laser beam needs to become so complex that energy of the laser beam is attenuated greatly. If machining is performed not by a high-output laser but by a more general-purpose laser light source, it is preferable that the machining threshold is as low as possible. In the existing circumstances an effect of widening the limit of lasers allowed to be used can be obtained when the threshold is not larger than 1.0 J/cm$^2$ per laser beam pulse as described above.

In the invention, the laser machining-purpose glass contains at least one member selected from the group consisting of titanium, iron, vanadium, bismuth, lead, thallium, tin, cerium, rhodium, and cobalt. This is effective in reducing the laser machining threshold of the glass because these elements exhibit high absorption in the wavelength range of the laser beam used in the invention.

BRIEF DESCRIPTION OF THE DRAWINGS

FIG. 8 is a typical view showing an example of the shape of the glass structure in Embodiment 9 of the invention.

DETAILED DESCRIPTION OF THE PREFERRED EMBODIMENTS

The invention aims at processing glass three-dimensionally freely.

Although embodiments of the invention will be described below, the invention is not limited to the embodiments.

Figure 1:
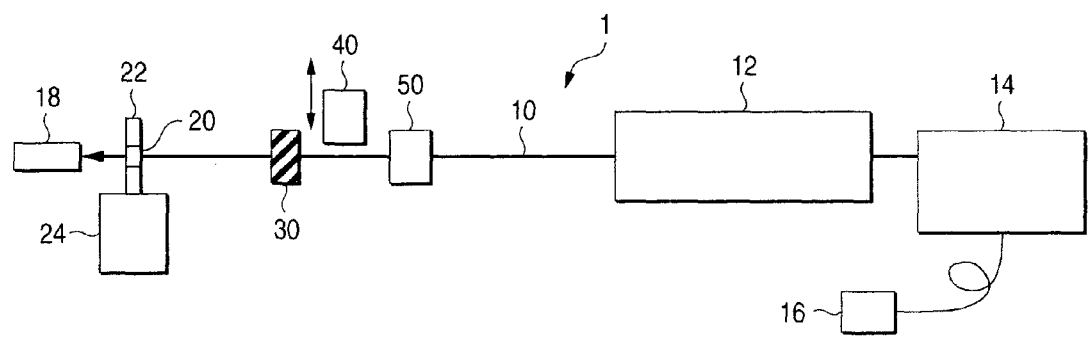
FIG. 1 is a typical view showing the configuration of a laser beam irradiation system.

A laser beam irradiation system 1 as shown in FIG. 1 is used for processing a glass substrate by laser beam irradiation as follows.

A laser beam 10 emitted from a laser light source 12 is converged by a lens (not shown) and applied on a glass substrate 20 fixed to a substrate holder 22 on a stage 24. An attenuator 50 is a device for changing energy of the laser beam passing through the attenuator 50. The energy of the laser bream passing through the attenuator 50 can be adjusted by manipulation of a micrometer. The laser beam 10 is applied on the glass substrate 20 after power of the laser beam 10 is adjusted by the attenuator 50.

The stage 24 is a stage which can be moved three-dimensionally freely in an axis in a direction parallel to an optical axis of the laser beam and in two axes in a plane perpendicular to the optical axis of the laser beam. The movement of the stage 24 can be performed on the basis of an electric signal and can be controlled as it is determined in advance. Alternatively, a stage 26 which can be moved in a direction parallel to the optical axis of the laser beam and which can rotate the substrate may be used. The stage 26 will be described later.

The substrate holder 22 can be inclined freely to the optical axis of the laser beam. With respect to the kind of the laser beam, the laser light source 12 can be interchanged so that a laser beam can be selected from the third harmonic (wavelength: 355 nm) and fourth harmonic (wavelength: 266 nm) of an Nd:YAG laser and the laser beam of a KrF excimer laser (wavelength: 248 nm). As occasion demands, a mask (not shown) may be put on the optical axis in a neighborhood of the glass substrate 20 to thereby change the diameter or size of the laser beam.

Incidentally, because the laser light source 12 generates a high energy beam, remote control can be used for ensuring safety so that a power supply/cooling water supply unit 14 for the laser light source 12 is operated by a remote controller 16. Though not shown particularly, a shutter is built into the laser light source 12 itself. The shutter can be controlled remotely. The laser beam transmitted through the glass substrate 20 is absorbed to a beam damper 18.

The machining threshold is measured as follows. An Nd:YAG laser capable of emitting ultraviolet beams at a wavelength of 266 nm (fourth harmonic) and a wavelength of 355 nm (third harmonic) is used as the laser light source 12. The laser has a pulse repetition frequency of 20 Hz and a beam width of from 5 nm to 8 nm. The laser beam is converged by a lens (not shown) with a focal length of 100 nm and then applied on the glass substrate 20 fixed to the substrate holder 22 on the stage 24. An irradiation shutter 30 controls the irradiation time to 2 seconds.

Energy of the laser beam is measured with a power meter 40 which is put in an optical path of the laser beam in the condition that the irradiation shutter is shut. In the condition that the laser beam is applied on the glass substrate 20 while this energy is changed by the attenuator 50, critical energy causing ablation is obtained as a machining threshold.

Incidentally, in each of the following Embodiments, a test is performed on a glass substrate made of silicate glass containing about 25% by mole of titanium (Ti) and exhibiting a machining threshold of 10 J/cm$^2$ per laser beam pulse.

(Embodiment 1)

The substrate holder 22 was inclined by a predetermined angle θ from a direction perpendicular to the optical axis of the laser beam 10 to thereby produce an oblique hole inclined at the angle to the thickness direction of the glass substrate 20. The angle of the oblique hole can be adjusted by adjustment of the inclination angle θ of the specimen.

Figure 2:
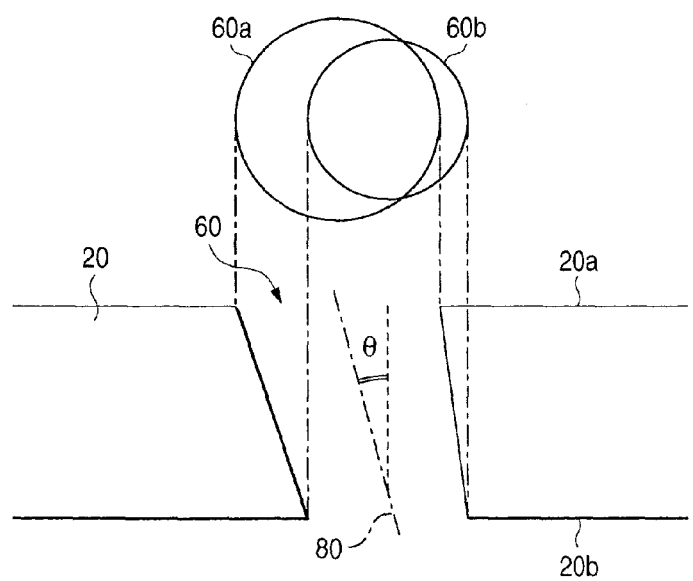
FIG. 2 is a typical view showing a glass structure having a through-hole formed therein in Embodiment 1 of the invention.

FIG. 2 typically shows sectional and plan views of a through-hole 60 formed in a 0.3 mm-thick glass substrate 20 fixed to be inclined at an angle θ=15° to the optical axis of the laser beam 10 when irradiation energy per unit area of the laser beam is constant (8 J/cm$^2$). (For convenience' sake, the hole diameter shown in FIG. 2 is magnified to be larger than the actual value compared with the thickness of the substrate.)

Incidentally, the beam diameter of the laser beam 10 on a front surface of the substrate was set at about 100 μm. The shapes 60a and 60b of the hole 60 at front and rear surfaces 20a and 20b of the substrate 20 are substantially circular. Incidentally, the front surface 20a is a surface facing the laser light source 12. The shape of any section of the hole taken in between the front surface 20a and the rear surface 20b of the substrate 20 to be parallel to the surfaces of the substrate 20 is also substantially circular. The hole is tapered off in the direction of the depth so that the sectional area of the hole on the rear surface side of the glass substrate is smaller than the sectional area of the hole on the front surface side of the glass substrate.

Figure 3:
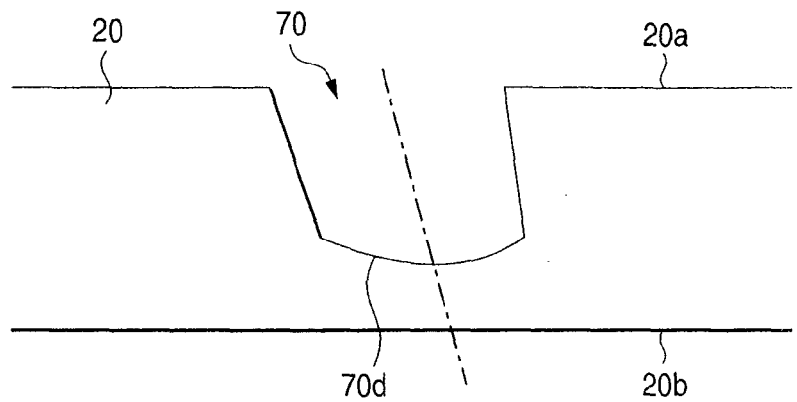
FIG. 3 is a typical view showing a glass structure having a cavity formed therein in Embodiment 1 of the invention.

If laser beam irradiation is stopped before the hole pierces the glass substrate perfectly, a cavity 70 as shown in FIG. 3 can be formed. As shown in FIG. 3, the bottom 70d of the cavity 70 is formed as a concavely curved surface but the cavity 70 is formed as a hole substantially circularly shaped in section in the same manner as the through-hole 60 in a range of from the front surface of the substrate to a neighborhood of the bottom of the cavity.

The hole can be also formed when any one of the third and forth harmonics of an Nd:YAG laser and a KrF excimer laser beam is used as the laser beam. When machining is performed in the condition that the irradiation angle and irradiation power of the laser beam are kept constant, the sectional shapes of the formed hole become similar to one another in the whole range in the case of a through-hole or in the range of from the front surface of the substrate to the neighborhood of the bottom of the cavity in the case of a cavity. The hole is tapered off so that the sectional area of the hole decreases gradually in the direction of the depth of the substrate.

Because any section perpendicular to the optical axis of the laser beam is substantially circular when a special process is not performed, any section of the formed hole is substantially circularly shaped if the inclination angle is small. As shown in FIG. 2, a line 80 connecting the respective centers of the sectional shapes of the hole is straight and inclined at an angle of about θ to the front surface of the substrate in accordance with the direction of irradiation of the laser beam.

(Embodiment 2)

The third and fourth harmonics of an Nd:YAG laser was used as a laser beam. Machining was performed while the irradiation power of the laser beam was changed by the attenuator 50. During the machining, the stage 24 was fixed and the distance between the laser light source 12 and the glass substrate 20 was kept constant. The initial value of irradiation energy per unit area was set at 15 J/cm$^2$. The irradiation energy was reduced with the passage of time, that is, the irradiation energy was changed continuously so that it became 5 J/cm$^2$ when the hole pierced the glass substrate 20. As the irradiation power decreased, the beam diameter of the laser beam decreased.

Under the condition, there was obtained a through-hole having a taper angle of about 10° which was large compared with the case where the irradiation power was constant. If the laser beam irradiation was stopped before the machined portion pierced the substrate, it was possible to form a cavity having the same taper angle as described above.

The taper angle of a side wall of the through-hole or the cavity could be changed when the rate of change of the irradiation power of the laser beam was changed. Incidentally, the concept "taper angle" means an angle between the wall surface of the hole and a line normal to the front surface of the glass substrate. That is, when the hole has a wall surface perpendicular to the front surface of the glass substrate, the taper angle is 0°. Other characteristics were the same as those in Embodiment 1.

Although this embodiment has shown the case where the irradiation power is changed continuously, the invention may be also applied to the case where the irradiation power is changed stepwise. Alternatively, the following method may be used. That is, irradiation with constant power is performed for a predetermined time. Then, irradiation is interrupted and the irradiation power is changed. Then, irradiation is re-started. When such a procedure is repeated, a tapered hole or a hole having an inner wall changing stepwise can be produced.

(Embodiment 3)

The third and fourth harmonics of an Nd:YAG laser were used as the laser beam. During machining, the stage 24 was moved in parallel to the direction of the optical axis of the laser beam 10 to change the distance L between the laser light source 12 and the glass substrate 20. While the diameter of the laser beam applied on the glass substrate 20 was changed in this manner, a through-hole or a cavity was produced. The irradiation power of the laser beam was kept constant during the machining.

Because a specimen is placed in front of a beam waist which is formed when the laser beam is converged by a lens, irradiation energy per unit area increases and the area irradiated with the laser beam decreases as the distance L between the light source and the surface irradiated with the laser beam increases.

The distance L between the laser light source 12 and the glass substrate 20 at the time of start of machining was set at 95 mm. The distance L was adjusted so that it became 100 mm when the hole pierced the glass substrate 20. The initial value of irradiation energy per unit area was set at 8 J/Cm$^2$.

Under the condition, there was obtained a through-hole or a cavity having a taper angle of about 10° which was large compared with the case where the irradiation power was constant. If the velocity of moving the stage 24 was changed, the taper angle of the through-hole or cavity produced thus could be changed. In addition, the distance could be changed intermittently.

(Embodiment 4)

During machining, the area of an aperture of a mask against the laser beam was changed gradually to thereby change the diameter of the laser beam applied on a specimen. While the size of a portion to be machined was changed in this manner, a through-hole or a cavity was produced. The third and fourth harmonics of an Nd:YAG laser were used as the laser beam. Irradiation power was kept constant before masking. The distance L between the laser light source 12 and the glass substrate 20 was kept constant during machining. The size of the aperture of the mask was changed in accordance with the mechanical change of a stop. The taper angle of the through-hole or cavity could be changed in accordance with the rate of change of the stop.

(Embodiment 5)

Figure 4:
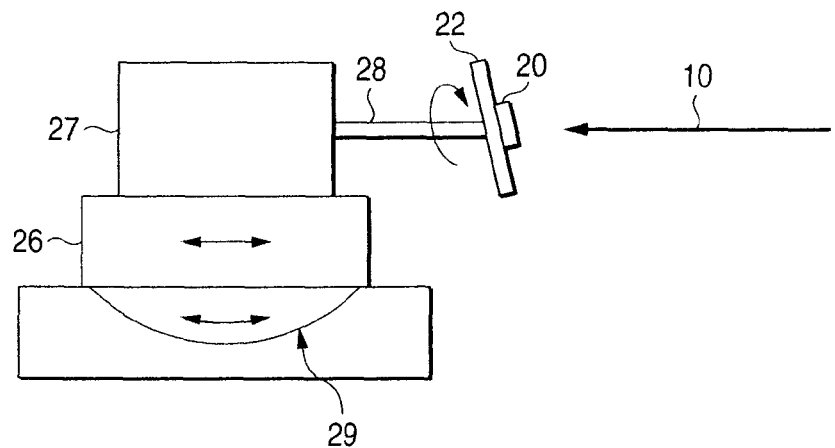
FIG. 4 is a typical view showing a modified example of the stage used in the laser beam irradiation system.

In the laser beam irradiation system 1 shown in FIG. 1, the stage 24 was replaced by a stage 26 shown in FIG. 4 for performing machining. A rotation drive mechanism 27 is provided on the stage 26. The substrate holder 22 is attached to a rotation shaft 28. The substrate holder 22 can be fixed to be inclined to the rotation shaft 28.

In the state shown in FIG. 4, the substrate holder 22 is obliquely attached to the rotation shaft 28 which is provided in parallel to the direction of the optical axis of the laser beam 10. In this state, the laser beam 10 is inclined at an angle to the glass substrate 20, so that the substrate can be irradiated with the laser beam 10 from all axially symmetrical directions when the rotation shaft is rotated.

A through-hole or a cavity shaped so that a conical portion having a vertical angle depending on the inclination angle of the substrate holder 22 is removed can be produced by this method. The third and fourth harmonics of an Nd:YAG laser were used as the laser beam.

Incidentally, there is further provided a mechanism 29 by which the rotation shaft 28 can be inclined to the optical axis of the laser beam 10 as well as the substrate position of the stage 26 can be moved in a direction parallel to the optical axis of the laser beam 10. Because the rotation shaft 28 can be inclined to the optical axis of the laser beam 10, a through-hole or cavity shaped like a cone having a central axis inclined to a line normal to the front surface of the substrate can be also formed.

(Embodiment 6)

Such a pinched-in structure that the diameter of the through-hole was once minimized in the middle of the hole and than increased was produced by the method used in Embodiment 5.

Figure 5:
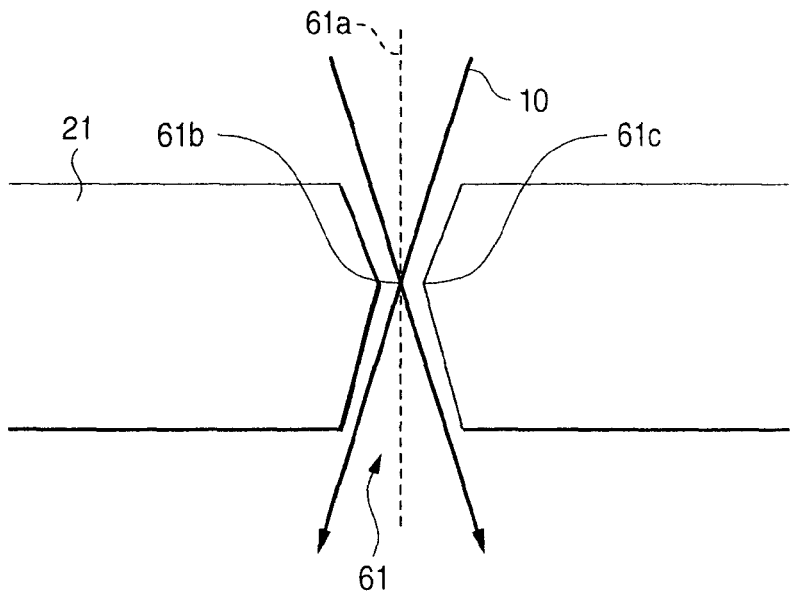
FIG. 5 is a typical view showing an example of the shape of the glass structure in Embodiment 6 of the invention.

A glass substrate 21 thicker than the glass substrate used in Embodiment 5 was used. The laser beam 10 was controlled so that a point 61b of intersection between the center 61a of rotation of the rotation shaft 28 and the laser beam 10 was placed in the inside of the glass substrate. Thus, a through-hole 61 having a pinched in shape 61c as shown in FIG. 5 was produced.

Figure 6A:
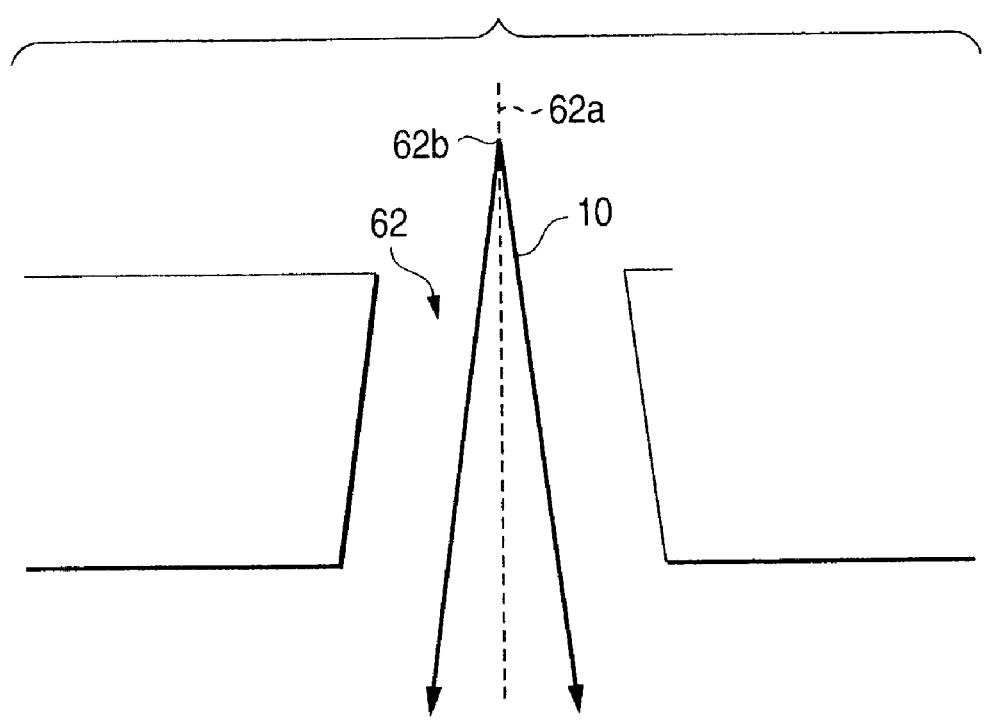
FIGS. 6A and 6B are typical views showing other examples of the shape of the glass structure in Embodiment 6 of the invention.
Figure 6B:
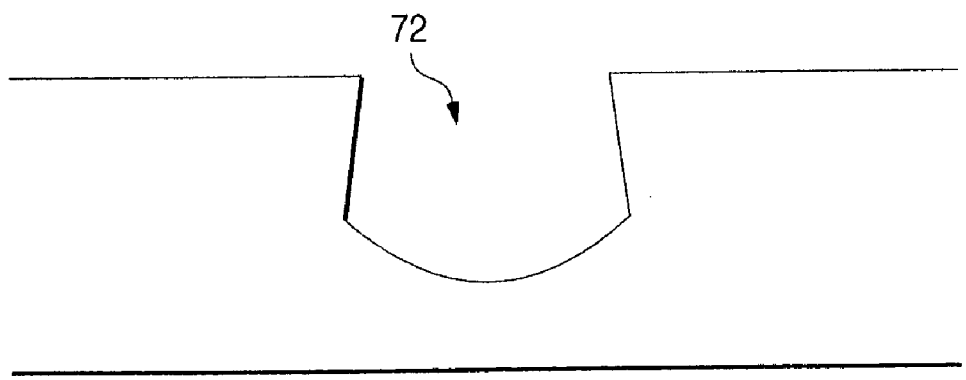

If a point 62b of intersection between the center 62a of rotation of the rotation shaft 28 and the laser beam 10 is placed above the glass substrate (on the surface side irradiated with the laser beam), a hole 62 enlarged in the direction of depth as shown in FIG. 6A can be produced. It is a matter of course that a cavity 72 (FIG. 6B) can be also produced.

Further, if the rotation shaft 28 is inclined to the optical axis of the laser beam 10, a hole having a sectional center inclined to a line normal to the front surface of the substrate can be also formed.

(Embodiment 7)

Figure 7A:
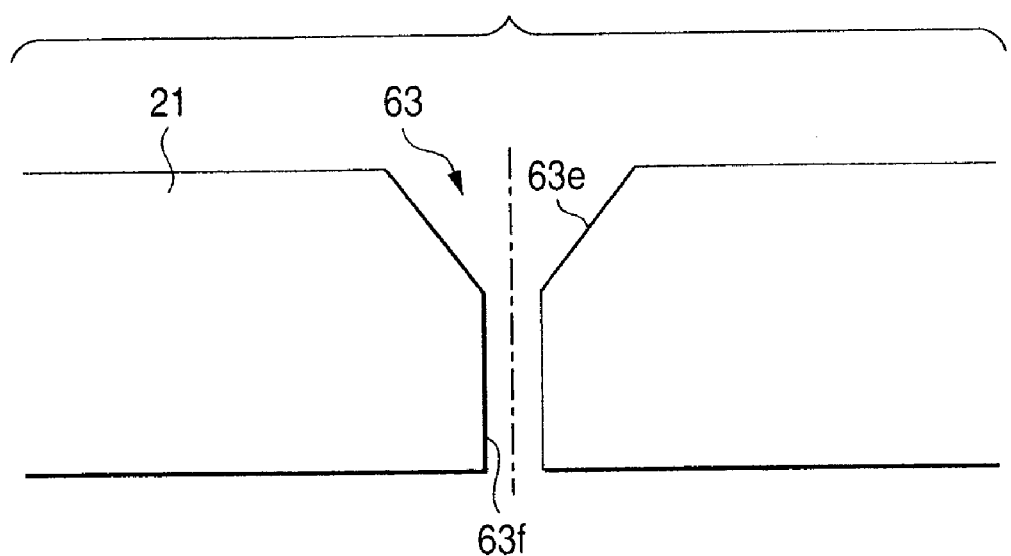
FIGS. 7A and 7B are typical views showing examples of the shape of the glass structure in Embodiment 7 of the invention.

The same substrate as the glass substrate 21 used in Embodiment 6 was used. First, a cavity 63e which was shaped so that a conical portion obtained in Embodiment 5 was removed was produced. Then, the rotation of the stage was stopped and the laser beam was applied on the lowermost point of the cavity so that the cavity pierced the specimen. Thus, a funnel-shaped structure 63 as shown in FIG. 7A was produced.

Figure 7B:
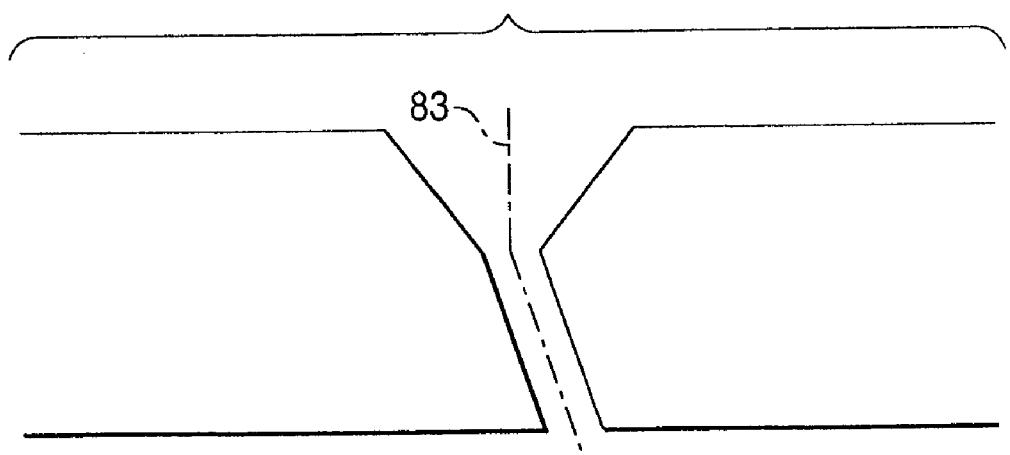

A lower pipe portion 63f of the funnel-shaped structure 63 could be inclined to the conical cavity portion 63e as shown in FIG. 7B when the inclination of the substrate holder 22 was changed. In this case, sections of the hole taken in parallel to the substrate surface are all circular in a range of from the front surface of the substrate to the rear surface but a line 83 connecting the respective centers of the sections is bent in the middle. If the inclination of the substrate holder 22 is changed gradually, the bending of the central line 83 can be provided as a smoothly curved line. The inclination of the pipe 63f is however limited because the laser beam 10 cannot be applied on the vertex portion of the cone in the condition that the pipe 63f is inclined at a larger angle than the angle of a line along the edge of the conical cavity 63e.

(Embodiment 8)

A KrF excimer laser beam was applied while a circular mask and a rectangular mask were used. Thus, a direct hole having circular and rectangular sectional shapes in accordance with the shapes of the masks was produced. FIG. 8 shows a structure 64 produced by this method. That is, after a rectangular cavity 64e is formed, the laser beam is applied on the bottom of the cavity in the same manner as in Embodiment 7 so that the specimen is pierced by a pipe 64f circularly shaped in section.

The pipe 64f can be inclined to a line normal to the front surface of the substrate in the same manner as in Embodiment 7. If a mask is used for machining the pipe portion, the pipe portion can be shaped like a rectangle or the like in section Titanium-containing glass produced by a melting method according to the invention was compared with glass containing silver imported by ion exchange in the same manner as described in JP-A-11-217237.

The system shown in FIG. 1 was used so that a laser beam was merely continuously applied on each plate-like specimen. Thus, a through-hole was formed in each glass substrate. The taper angles of the through-holes were compared with each other. As a result, the taper angle of the through-hole formed in the silver-imported glass was about 7° whereas the taper angle of the through-hole formed in the glass according to the invention was 5° which was a smaller value.

Incidentally, these values were measured in the case where a KrF excimer laser beam at a wavelength of 248 nm was used as the laser beam. Also in the case where the third harmonic (355 nm) and forth harmonic (266 nm) of an Nd:YAG laser were used, results were obtained that the taper angle in the glass according to the invention was smaller. When the taper angle is as small as possible, the shape of the hole can be controlled easily at the time of production of a three-dimensional structure in glass. Accordingly, it is confirmed that the glass according to the invention is suitable for production of such a three-dimensional structure.

According to the invention, a three-dimensional glass structure high in the degree of freedom can be produced when the optical axis of the laser beam or the specimen is moved. Incidentally, in the embodiment, the glass substrate to be machined contains titanium. For this reason, the machining threshold is so small that the degree of freedom in the shape allowed to be machined is improved greatly.

Incidentally, the element contained in the glass substrate need not be titanium. The same effect as in titanium can be obtained if the element contained in the glass substrate has a function of absorbing light of a visible or ultraviolet range as a wavelength band of the laser beam used. Iron, vanadium, bismuth, lead, thallium, tin, cerium, rhodium, cobalt, etc. are effective. It is preferable that the glass substrate contains at least one of these elements inclusive of titanium.

For example, the glass structure having a three-dimensional shape according to the invention can be industrially used for the following purposes to supply glass parts high in the degree of freedom in the shape for the purposes.

A two-dimensional hole array for insertion and two-dimensional arrangement of optical fibers.
An ink jet hole or hole array for ink jet printer.
A mask for printing a paste containing a pigment, ink or an electrical conductor or a solution containing an organic substance.
A wiring hole for making an electric wire pierce a glass substrate.
A glass chip for chemical analysis.
An X-ray collimator.
A mold for forming an optical component (such as a diffraction grating, a diffraction optical element or a lens).
A filter for solid, liquid or gas.
A carrier for holding a catalyst (such as metal).
A stop for limiting an optical path of light.

According to the invention, laser machining-purpose glass containing uniformly an element which can be imported into glass at the time of melting without ion exchange and which absorbs laser beam energy to reduce a machining threshold is used as a workpiece. Accordingly, good processability can be obtained even in the inside of glass. As a result, shape controllability becomes good even in the inside of glass, so that a processed glass article high in the degree of freedom three-dimensionally can be obtained. In addition, in the producing method according to the invention, energy of the applied laser beam can be controlled three-dimensionally, so that a glass structure having a predetermined three-dimensional shape can be produced easily with good controllability.

What is claimed is:

1. A glass structure comprising:
a glass substrate having substantially parallel surfaces wherein said glass substrate uniformly contains, imported into said glass substrate, at least one kind of element capable of absorbing energy of a laser beam so that good processability is obtained even in the inside of the glass, wherein said element is at least one member selected from the group consisting of titanium, iron, vanadium, bismuth, lead, thallium, tin, cerium, rhodium, and cobalt; and
a hole formed in said glass substrate so as to pierce said glass substrate in a thickness direction of said glass substrate;
wherein a limited portion of a surface of said glass substrate is removed by ablation or vaporization by energy of said laser beam which is changed intermittently or continuously, whereby a sectional shape and/or dimension of said hole defined in parallel to surfaces of said glass substrate is controllably varied between one surface and another surface of said parallel surfaces of said glass substrate.

2. A glass structure according to claim 1, wherein an area of the sectional shape of said hole decreases monotonically between said one surface and said another surface of said glass substrate.

3. A glass structure according to claim 1, wherein a position having a minimum value of the area of said sectional shape is located between the surfaces of said glass substrate.

4. A glass structure according to claim 1, wherein a line connecting centers of respective sectional shapes of said hole is formed as a straight line which is drawn between said one surface and said another surface of said glass substrate and which is inclined to a line normal to each of said surfaces of said glass substrate.

5. A glass structure according to claim 1, wherein a line connecting centers of respective sectional shapes of said hole is formed as a bent or curved line.

6. A glass structure according to claim 1, wherein said respective sectional shapes of said hole have similar shapes between said one surface and said another surface of said glass substrate.

7. A glass structure according to claim 1, wherein said glass substrate has a threshold of not larger than 1.0 J/cm$^2$ per laser beam pulse in terms of machining energy of said laser beam.

8. A glass structure as recited in claim 1 wherein said sectional shape or dimension or a taper angle of said hole varies stepwise between said surfaces of said substrate.

9. A glass structure comprising:
a glass substrate having substantially parallel surfaces wherein said glass substrate uniformly contains, imported into said glass substrate, at least one kind of element capable of absorbing energy of a laser beam so that good processability is obtained even in the inside of the glass, wherein said element is at least one member selected from the group consisting of titanium, iron, vanadium, bismuth, lead, thallium, tin, cerium, rhodium, and cobalt; and
a cavity formed in said glass substrate in a thickness direction of said glass substrate,
wherein a limited portion of a surface of said glass substrate is removed by ablation or vaporization by energy of said laser beam which is changed intermittently or continuously, whereby a sectional shape or dimension of said cavity defined in parallel to surfaces of said glass substrate varies is controllably varied between one surface of said surfaces of said glass substrate to a neighborhood of a bottom of said cavity.

10. A glass structure according to claim 9, wherein a position having a minimum value of an area of said sectional shape is located between the one surface of said glass substrate and the neighborhood of the bottom of said cavity.

11. A glass structure according to claim 9, wherein a position having a minimum value of an area of said sectional shape is located between the one surface of said glass substrate and the neighborhood of the bottom of said cavity.

12. A glass structure according to claim 9, wherein a line connecting centers of respective sectional shapes of said cavity is formed as a straight line which is drawn between the one surface of said glass substrate to the neighborhood of the bottom of said cavity and which is inclined to a line normal to the one surface of said glass substrate.

13. A glass structure according to claim 9, wherein a line connecting centers of respective sectional shapes of said cavity is formed as a bent or curved line.

14. A glass structure according to claim 9, wherein said respective sectional shapes of said cavity have similar shapes between the one surface of said glass substrate and the neighborhood of the bottom or said cavity.

15. A glass structure as recited in claim 9 wherein said sectional shape or dimension or a taper angle of said cavity varies stepwise between said surfaces of said substrate.

16. A glass structure comprising:
a glass substrate having substantially parallel surfaces wherein said glass substrate uniformly contains, imported into said glass substrate, at least titanium so that good processability is obtained even in the inside of the glass; and
a hole or cavity formed in a thickness direction of said glass substrate;
wherein a sectional shape and/or dimension of said hole or cavity defined in parallel to surfaces of said glass substrate is controllably varied with distance from a surface of said glass substrate.

* * * * *